Oct. 18, 1960 L. A. COX 2,956,294
MULTIPLE SPINDLE TAPPING MACHINE WITH INCLINED
ROTARY DUAL DISC WORK CARRIER MEANS
Filed Nov. 20, 1956 2 Sheets-Sheet 2

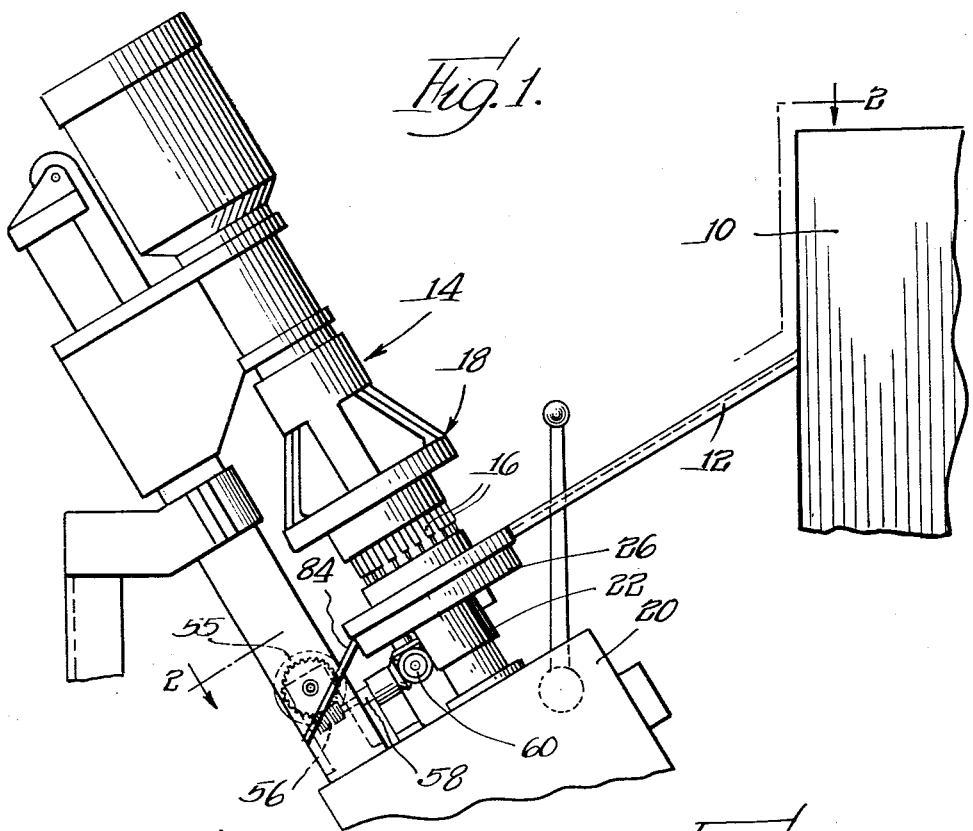

INVENTOR.
Linwell A. Cox
BY Olson & Trexler
attys.

United States Patent Office 2,956,294
Patented Oct. 18, 1960

2,956,294

MULTIPLE SPINDLE TAPPING MACHINE WITH INCLINED ROTARY DUAL DISC WORK CARRIER MEANS

Linvell A. Cox, Elgin, Ill., assignor to Illinois Tool Works, Chicago, Ill., a corporation of Illinois Filed Nov. 20, 1956, Ser. No. 623,321

1 Claim. (Cl. 10—130)

This invention is concerned generally with the formation of fastening elements, and more particularly with the provision of a machine for drilling or tapping a plurality of nuts.

Machines are known in the art for substantially drilling or tapping a plurality of apertures in a workpiece, i.e. a plurality of similar tools in such a machine bores the holes in the workpiece or else taps holes therein.

It is an object of this invention to provide improved means or mechanism for feeding nut blanks to such a machine for drilling or tapping of the blanks.

More specifically, it is an object of this invention to provide means or mechanism for feeding a plurality of nut blanks into position for operation thereon by a machine for drilling or tapping holes in the nut blanks.

Other and further objects and advantages of the present invention will be apparent from the following description when taken in connection with the accompanying drawings, wherein:

Fig. 1 is a side view of an apparatus embodying the principles of this invention;

Fig. 2 is a top view partially in section as taken substantially along the line 2—2 in Fig. 1;

Figure 3:
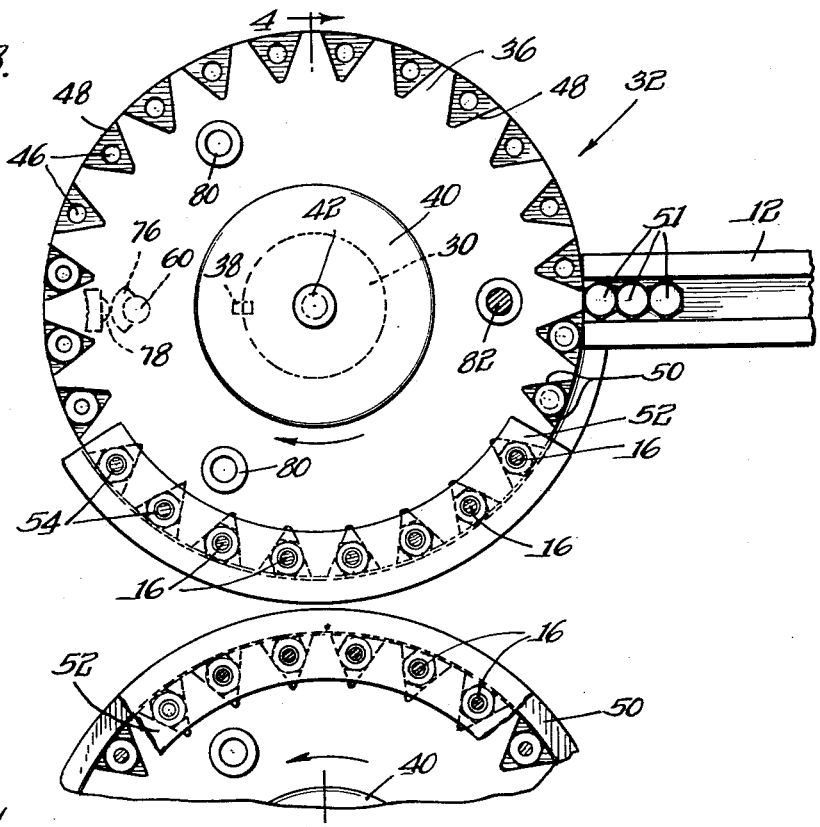
Fig. 3 is an enlarged plan or top view of an important section of the feeding mechanism.
Figure 4:
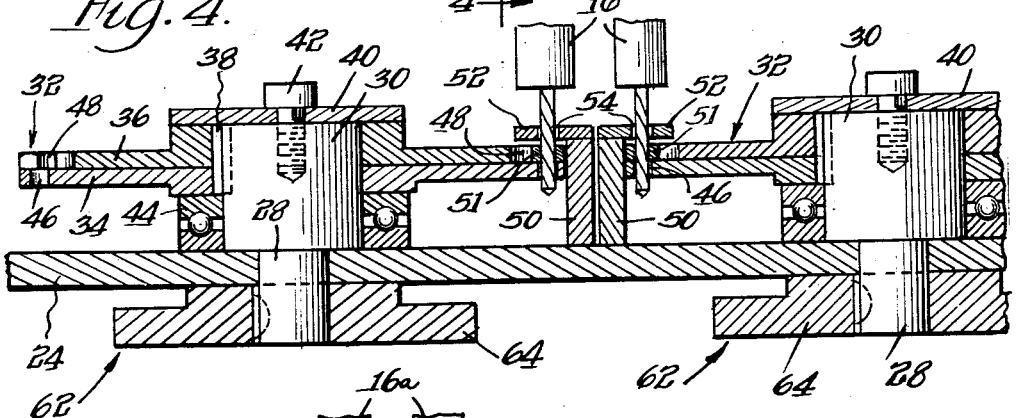
Fig. 4 is a cross-sectional view through the mechanism of Fig. 3 as taken substantially along the line 4—4 in Fig. 3.

Referring now in greater particularity to the drawings, there will be seen a nut element blank hopper or supply mechanism 10 of any suitable type known in the art for supplying nut blanks sliding transversely down a gravity chute 12. In the preferred embodiment of this invention, there are two such chutes, as readily may be seen in Fig. 2, and it will be appreciated that the internal constuction of the hopper or supply mechanism 10 has certain duplicated parts for supplying two sets of nut blanks.

The nut blank chutes 12 lead to a position below, and peripherally adjacent to a multiple spindle drill tapper indicated generally by the numeral 14. This may be of a type well known in the art, and available commercially as a "Cleveland Junior multiple spindle drill-tapper." Accordingly, it is believed unnecessary to disclose this mechanism in detail. As is known, this includes a plurality of tool carrying spindles 16 having lower ends adapted to bore holes, or adapted to tap the bores already in a workpiece. The spindles in this instance are arranged in a pair of symmetrical arcs convex toward one another, and almost tangent, as may be seen in section in Fig. 2 and also in Fig. 3. The head 18 carrying the spindles 16 is capable of raising and lowering under electrical or pneumatic control, and the head for example, may be the type known as a "Zagar" head.

The machine also includes a base 20 having an upper surface inclined at the same angle as the nut chutes 12, but spaced therebelow. Pedestal means 22 upstanding from the base and perpendicular to the upper surface thereof supports a table 24 having a drive housing or casing 26 therebeneath. A pair of shafts 28 is rotatably journalled in the table 24 in spaced relation, and the shafts 28 are provided at their upper ends with enlarged heads 30.

A disc assembly 32 is mounted on each of the heads 30, and each disc assembly 32 comprises a nut blank supporting plate or disc 34, and an overlying nut positioning disc 36. Both of these discs are keyed to the head 30 as at 38, and the discs are held down by a thrust plate 40 and a bolt 42 against a suitable ball bearing 44 interposed between the disc assembly and the table 24.

The lower or nut blank supporting disc 34 is provided with peripherally disposed, equally arcuately spaced spindle apertures 46, and the upper or nut positioning disc 36 is provided with edge opening recesses 48 aligned with the recesses 46. The edge opening recesses 48 are provided with diverging edges 50 adjacent the periphery of the disc for closely receiving the sides of a nut blank 51 as the nut blanks are received from the chutes 12. The diverging sides 50 prevent rotation of the nut blanks as will be apparent.

As noted heretofore, there are two disc assemblies 32, and these disc assemblies are laterally aligned, and somewhat separated. A pair of reversely oriented retaining walls 50 upstands from the table 24 between the disc assemblies 32. Arcuate stripper plates 52 are secured to the tops of the retaining walls or are formed integral therewith and overlie the peripheries of the disc assemblies 32. Stripper plates 52 are provided with a plurality of apertures 54 which are arcuately spaced equally to the spacing of the apertures 46 and 48, the latter apertures being designed to be arrested in alignment with the apertures 54.

The disc assemblies 32 are designed to be driven intermittently in synchronism by a motor 55 (Fig. 1). This motor acts through suitable worm gearing 56 to drive a shaft 58 lying on the center line between the disc assemblies 32. The shaft 58 is connected through suitable gearing and shafting 60 to a pair of Geneva mechanisms 62, only one of which is shown (Fig. 2). The driven element 64 of the Geneva mechanism 62 comprises six segments, alternate ones of which have scalloped outer surfaces 66. The driving element comprises a locking segment 68 cooperable with the scallops 66, and substantially of 120° in arcuate extent. The driving element, hereinafter identified by the numeral 70, further includes a pair of arms 72 having rollers 74 thereon oriented at 120° for cooperation with the segments of the driven element 64. Accordingly, the disc assemblies 32 are driven one third of a revolution at a time.

A suitable control is provided, such as (Fig. 3) a cam 76 on part of the shafting 60 and cooperable with a control 78, which may be either electrical or pneumatic, for operating the drill tapper 14 when the disc assemblies 32 are stationary. Further, in Fig. 3, it will be observed that the disc assembly is provided with three equally spaced locating pin apertures 80, preferably having bushings therein. The head 18 is provided with a pair of locating pins 82 only one of which is shown in Fig. 3) for cooperation with the disc assemblies 32 in order to insure proper alignment thereof with the spindles 16. The operation of the machine is simple in view of the foregoing description. Thus, nut blank 51 gravitationally descend the chutes 12 and pass into the recesses 48 and are positioned above the recesses 46, such transfer being accomplished while the disc assembly is moving. The two disc assemblies then stop with nut blanks beneath the stripper plates 52. In the illustrative embodiment, the disc assemblies each have twenty-four apertures or recesses, and eight nut blanks are positioned at any given time below each of the stripper plates. Correspondingly, the head carries sixteen spindles with drilling tools arranged in eight arcuate rows. However, it will be understood that larger or smaller numbers of corresponding parts could be used in accordance with this invention. In any event, when the disc assemblies are stopped after one third of a revolution, the operating mechanism of the drilling and tapping machine 14 is actuated by the control 78 under the influence of the cam 76, and the head 18 descends. The drilling tools 16 then proceed to drill holes in the nut blanks. The head then is raised to disengage the spindles or tools from the tapped nuts, the stripper plates holding the nuts down as the head is raised. Subsequently, the Geneva mechanism effects one third of a revolution of movement of each of the disc assemblies, and the finished nuts gravitationally fall from the lower edges of the inclined disc assemblies, where they may be collected in chutes 84, for example, or where they may pass directly to a storage mechanism, or any suitable conveying mechanism.

Figure 5:
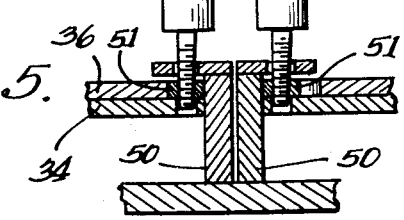
Fig. 5 is a view similar to a part of Fig. 4 showing a modification.

Alternatively, as may be seen in Fig. 5, the spindles 16a may be provided with tapping tools for forming threads in nut blanks already having holes therein. If desired, successive machines may be arranged adjacent one another successively to drill and to tap most nut blanks. It will be understood that the only difference resides in the tools operating on the nut blanks either to drill or to tap the blanks.

It is to be understood that the specific example of the invention as herein shown and described is for illustrative purposes only. Various changes in structure will no doubt occur to those skilled in the art, and are to be understood as forming a part of this invention, insofar as they fall within the spirit and scope of the appended claim.

The invention is claimed as follows:

Apparatus for producing nuts comprising a pair of disc means having peripherally disposed arcuately spaced recesses therein, said disc means being inclined and coplanar, and being laterally displaced from one another relative to the direction of inclination, each of said disc means including a lower disc having peripherally disposed arcuately spaced relatively small recesses therein and an upper disc having relatively large edge opening recesses respectively aligned with and communicating with the recesses of the lower disc, inclined feed chute means having discharge end means respectively substantially on a level with the upper discs for supplying nut blanks to the recesses of the upper discs and overlying the recesses in the lower discs, the recesses in the upper discs being generally triangular in configuration and having a pair of fixed angularly related sides a portion of which is complementary to and engageable with nut blanks for holding the nut blanks against rotation, said angularly diverging sides defining an open end of the recess which is substantially larger than the nuts to be retained, the nut blanks overlying the relatively small recesses and being supported on the lower discs, retaining wall means interposed between said disc means at the most nearly adjacent portions thereof and having oppositely facing arcuate sections confronting the disc means for holding nut blanks in the upper disc recesses, stripper means on said wall means overlying adjacent portions of said disc means, means for intermittently rotating said disc means in relatively opposite directions through arcs commensurate in extent with the arcuate extent of said stripper means and arresting said disc means with said nut blanks underlying said stripper means, said stripper means having apertures therein with which the nut blanks are aligned when the disc means are arrested, discharge chute means inclined at an angle closer to vertical than the inclination of said disc means and feed chute means, said discharge chute means each being positioned adjacent said disc means diametrically opposite said feed chute means, a mouth portion of said discharge chute means adjacent said disc means having a relatively large arcuate extent of approximately one-third of the perimeter of said disc means, a mechanism having a pair of sets of elongated rotary metal removing tools arranged in a pair of arcuate patterns and aligned with the apertures in the stripper means and spaced axially therefrom, central support means for said mechanism disposed in close proximity to each of said retaining wall means and stripper means, and means for controlling operation of said mechanism when said disc means are arrested to cause said tools to remove metal from the centers of the nut blanks underlying the stripper means, the nuts so produced gravitationally passing from the recesses of the upper discs to said mouth portion of said discharge chute means upon subsequent rotation of said disc means.

References Cited in the file of this patent

UNITED STATES PATENTS

| 917,269 | Eden | Apr. 6, 1909 |
| 1,028,526 | Baerwalde | June 4, 1912 |
| 1,918,150 | Swahnberg | July 11, 1933 |
| 2,337,371 | Cole | Dec. 21, 1943 |
| 2,390,649 | Hoffman | Dec. 11, 1945 |
| 2,643,403 | MacBlane | June 30, 1953 |
| 2,728,092 | Poupitch | Dec. 27, 1955 |

FOREIGN PATENTS

| 454,371 | Great Britain | Sept. 25, 1936 |